United States Patent [19]

Hedstrom

[11] 4,387,529
[45] * Jun. 14, 1983

[54] ELECTRONIC INSECT KILLER

[75] Inventor: Mark D. Hedstrom, Vincennes, Ind.

[73] Assignee: Delta Promotions, Inc., Vincennes, Ind.

[*] Notice: The portion of the term of this patent subsequent to Feb. 3, 1998, has been disclaimed.

[21] Appl. No.: 220,414

[22] Filed: Dec. 29, 1980

Related U.S. Application Data

[63] Continuation-in-part of Ser. No. 42,940, May 29, 1979, Pat. No. 4,248,005.

[51] Int. Cl.³ .................... A01M 1/04; A01M 1/22
[52] U.S. Cl. .................................... 43/112; 43/113
[58] Field of Search .................. 43/112, 113, 98, 99; 315/DIG. 7; 363/22, 23, 24, 25

[56] References Cited

U.S. PATENT DOCUMENTS

| | | | |
|---|---|---|---|
| 2,982,881 | 5/1961 | Reich | 315/205 |
| 3,192,464 | 6/1965 | Johnson et al. | 321/2 |
| 3,321,862 | 5/1967 | Peek | 43/112 |
| 3,371,244 | 2/1968 | Boland | 315/219 |
| 3,579,026 | 5/1971 | Paget | 315/99 |
| 3,619,713 | 11/1971 | Biega | 315/105 |
| 3,691,450 | 9/1972 | Cox | 321/45 R |
| 3,708,907 | 1/1973 | Cole | 43/112 |
| 3,729,857 | 5/1973 | Giordano | 43/112 |
| 3,889,153 | 6/1975 | Pierce | 315/209 R |
| 3,914,679 | 10/1975 | Sullivan | 363/25 |
| 3,935,662 | 2/1976 | Hamid et al. | 43/112 |
| 3,986,292 | 10/1976 | Klebanoff | 43/112 |
| 4,042,852 | 8/1977 | Zaderej et al. | 315/97 |
| 4,103,356 | 7/1978 | Finlay | 363/22 |
| 4,121,371 | 10/1978 | Kaphengst et al. | 43/112 |
| 4,248,005 | 3/1981 | Hedstrom | 43/112 |

Primary Examiner—Nicholas P. Godici
Assistant Examiner—M. Jordan
Attorney, Agent, or Firm—Kalish & Gilster

[57] ABSTRACT

An electronic insect killer has spaced electrodes adapted to be electrically contacted by bodies of insects, said electrodes surrounding fluorescent lamps which attract the insects toward the electrodes. Interconnected with the electrodes and the fluorescent lamps is a solid state inverter which provides a high AC voltage at high frequency which is rectified to provide a high DC voltage across the electrodes, as well as lower AC voltage at high frequency for energizing the lamps without ballasting.

9 Claims, 7 Drawing Figures

U.S. Patent  Jun. 14, 1983  Sheet 1 of 3  4,387,529
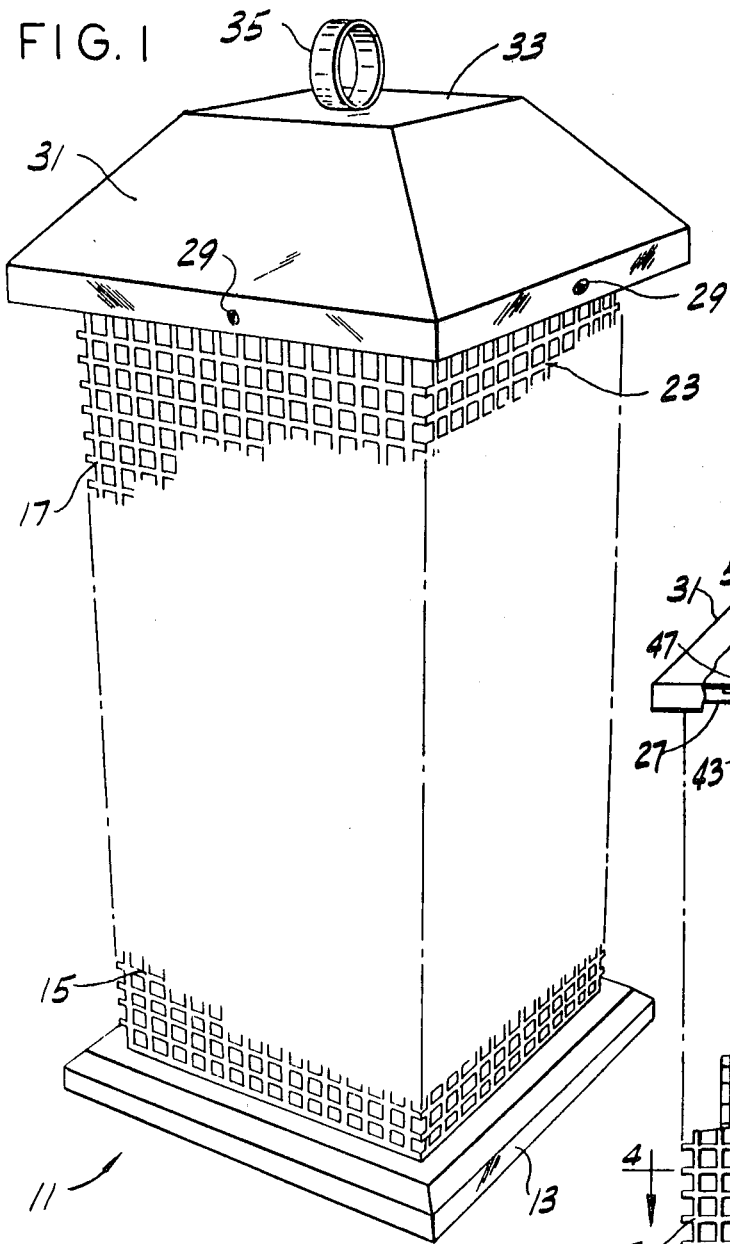
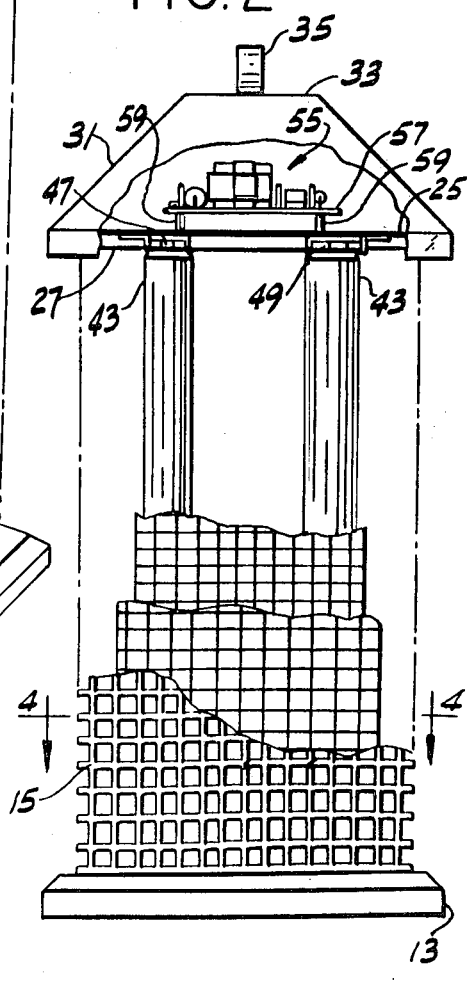

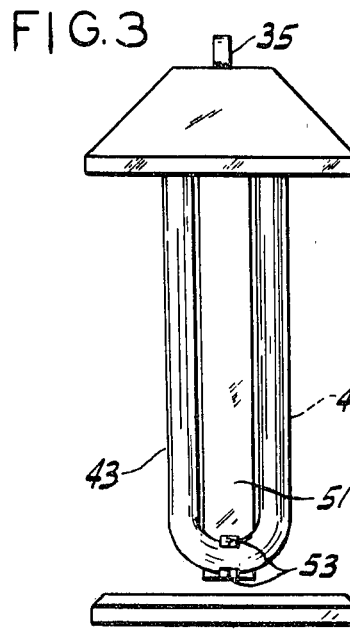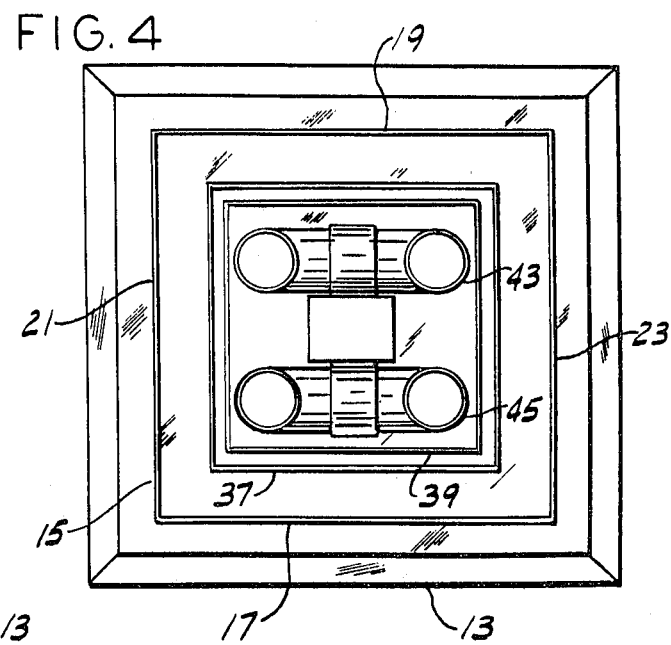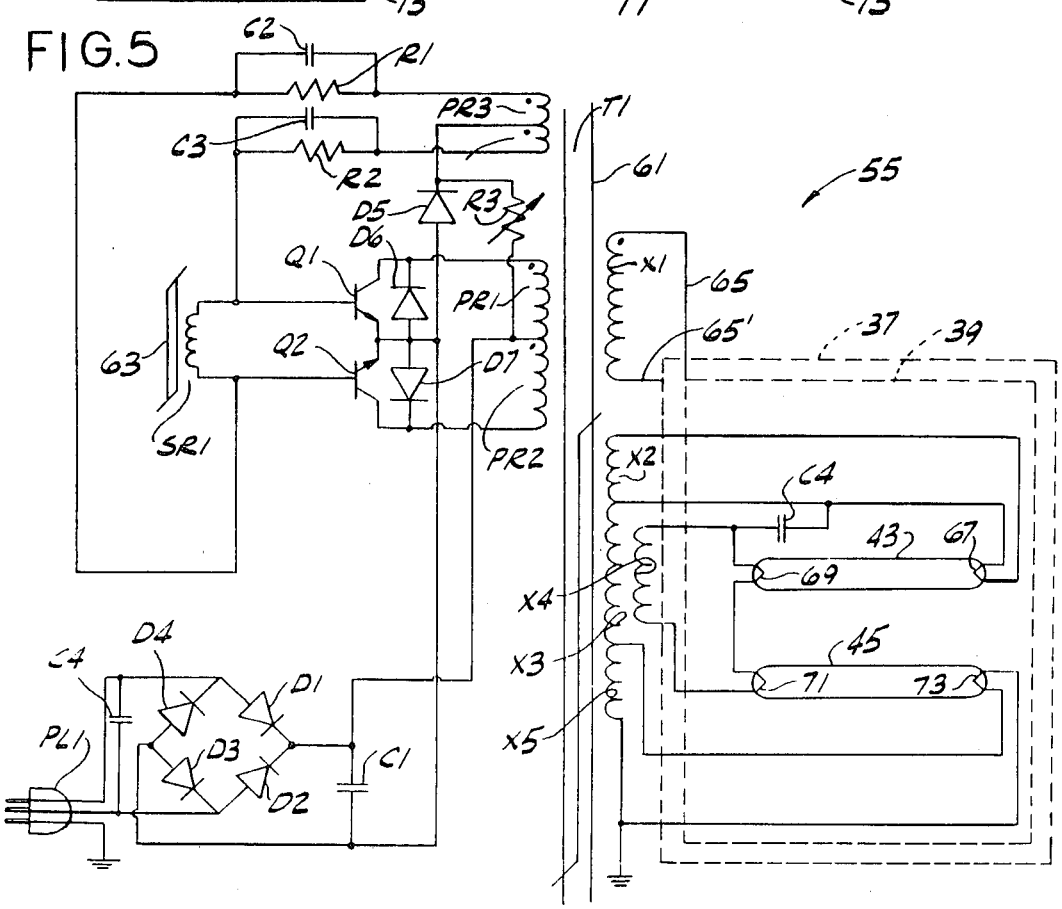

ELECTRONIC INSECT KILLER

CROSS-REFERENCE TO RELATED APPLICATION

This application is a continuation-in-part of the U.S. patent application of Mark D. Hedstrom, Ser. No. 42,940, filed May 29, 1979, for ELECTRONIC INSECT KILLER, Pat. No. 4,248,005.

BACKGROUND AND SUMMARY OF THE INVENTION

The present invention relates to devices for killing insects by electrocution and, more particularly, to a device of electronic character for killing insects by electrocution.

It has heretofore been known to utilize AC voltage for killing insects by applying the voltage across spaced electrodes and with the insects being attracted toward the electrodes by fluorescent lighting.

For this purpose, devices have been sold commercially which employ simple step-up transformers for stepping up conventional 60 Hertz AC line voltage to a level suitable for electrocuting insects which come into contact or close proximity to electrodes across which the 60 Hertz higher voltage is present. To provide sufficient current for this, the transformer is required to be large, bulky, clumsy and expensive.

Moreover, in practice a very high failure rate has occurred with such transformers. The failure mode resulting in a failure rate is not well understood but is believed to result in part from high temperature causing dielectric breakdown and in part because of the transmigration of the winding elements (e.g., copper) to the opposite ends of the transformer core, possibly the result of corona which is characteristic of such transformers. The transmigration of elemental constituents eventually causes shorting of the turns. But regardless of the reasons for such frequent failure, it is undesirable and has caused conventional insect electrocuters to be less commercially successful than would otherwise be the case.

A further disadvantage of the use of such simple transformers for stepping up the 60 Hertz AC line voltage is that voltage regulating devices must be connected across the secondary winding to prevent extensive voltage variations which could cause arcing between electrodes and which can result from poor transformer voltage tolerances. Also, high voltage variations could preclude obtaining safety certification of such devices by testing and certification agencies such as Underwriters' Laboratories, Inc.

A related shortcoming of these prior art electrocuters is that, due to size limitations and current output restrictions at 60 Hertz which are necessitated by such certification, the electrocuter may be electrically overloaded or shorted by insect carcasses clinging to the electrodes since typically electrocuters have lacked sufficient power to carbonize the carcasses. Hence, these prior art devices sometimes clog with dead insects. Short circuit protection is required in prior art devices to protect against damage to the transformer from such shorting of the electrodes.

As noted, fluorescent lighting has been used in prior art electrocuters to attract insects. The fluorescent lamps have required the use of lamp ballasts which are known to be space-consuming, heavy, and expensive. The ballasts also generate heat which may contribute to the failure of other components in the electrocuters, such as the above-mentioned step-up transformers.

Such problems of the prior art have been long outstanding and have remained unsolved.

An object of the invention is the provision of a device for killing of insects by electrocution, which device is electronic.

A further object of the invention is the provision of such an electronic insect killer which utilizes a high efficiency, compact, low cost, high power, reliable, and lightweight solid state ciccuit.

Another object of the invention is the provision of such an electronic insect killer which is not prone to electrical failure, clogging by insects or self-destruction by short circuiting.

Yet another object of the invention is the provision of such an electronic insect killer including such a solid state circuit which not only develops high voltage for insect electrocution but also produces lower voltage for energizing fluorescent lamp means to attract insects toward the electrodes.

Yet another object of the invention is the provision of such an electronic insect killer including solid state circuitry for energizing such fluorescent lamp means without ballasting.

A still further object of the invention is the provision of such an electronic insect killer which develops sufficient electrical energy for carbonizing insects to avoid clogging, overloading, short circuiting of electrodes, etc. by insect carcasses.

A further object of the invention is the provision of such an electronic insect killer which develops such high electrical energy without compromising safety.

Yet another object of the inventon is the provision of such an electronic insect killer which is self-regulating and is by design self-protected against short circuiting.

Still another object of the invention is the provision of such an electronic insect killer which utilizes electrically efficient components which develop relatively little heat.

Among still other objects of the invention may be noted the provision of such an electronic insect killer which conduces to economical mass production, simple assembly, facile repair, which is simple and effective in design, and which kills flies, mosquitoes and myriad other species of various flying insects.

BRIEF DESCRIPTION OF THE DRAWINGS

FIG. 1 is a perspective view of an electronic insect killer constructed in accordance with and embodying the present invention.

FIG. 2 is a front vertical elevation of the electronic insect killer of FIG. 1 with a top of the device being broken away in part to show electronic circuit components.

FIG. 3 is a front vertical elevation with certain gridlike cover and electrode elements removed.

FIG. 4 is a horizontal transverse cross-sectional view taken generally along line 4—4 of FIG. 2.

FIG. 5 is a schematic circuit diagram of electronic circuitry of the new electronic insect killer.

Corresponding reference characters indicate corresponding parts throughout the several views of the drawings.

DESCRIPTION OF THE PREFERRED EMBODIMENTS

Figure 6:
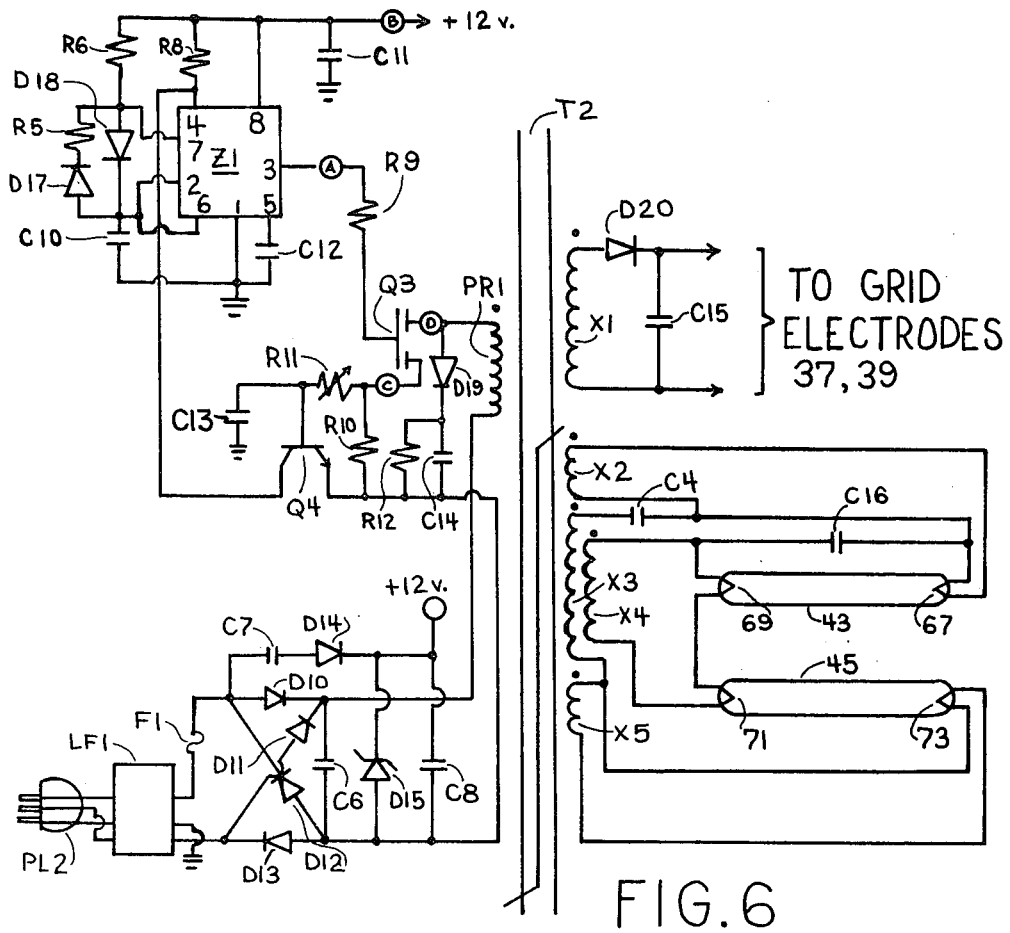
FIG. 6 is a schematic circuit diagram of alternative electronic circuitry of the new electronic insect killer.

Referring now to FIGS. 1-4, a new insect killer of the invention is designated generally at 11. The new devices comprises a metal base 13, e.g., of formed sheet metal. Secured to and extending upwardly from base 13 is an upstanding protective housing 15. Housing 15 is of rectangular tubular configuration and constructed of perforated sheet metal to provide grid-like front and rear panels 17, 19 and side panels 21, 23. The perforations may each typically be about one-half inch square.

Referring to FIG. 2, extending across the top of housing 15 is an inner cover 25 for closing the upper end of housing 15 and which cover may simply be a single rectangular piece of sheet metal having a downwardly turned flange 27 extending around its periphery.

Secured, as by sheet metal screws 29 threaded to flange 27, is an outer cover 31 of truncated pyramidic configuration and also formed of sheet metal. A flat upper surface 33 of the cover is provided with a metal ring 35 for permitting the new insect killer to be suspended, as in a stable or commercial establishment, above ground level. Alternatively, it may be supported by its base 13 upon any suitable surface.

Referring to FIGS. 3 and 4, there is contained within cover closely spaced, concentric outer and inner grid-like electrodes 37, 39, respectively, which may be referred as grids. Each has mesh-like character and is of rectangular form, with the mesh spacing being preferably about one-half inch in both vertical and horizontal directions, the outer and inner grids having also about one-half inch spacing betwen them. Grids 37, 39 are supported top and bottom by electrically insulating stand-offs or supports 41 in spaced relation to base 13 and inner cover 25. Said grids 37, 39 are adapted to establish high-voltage electrical contact with the bodies of insects for electrocution of such insects. It should be understood that the insects may not actually contact either of grids 37, 39 but instead may simply induce an arc from one grid and through the insect body toward the other grid.

Insects are attracted toward grids 37, 39 and fly through the perforate openings of housing 15 in response to UV (ultraviolet) or so-called "black" light produced by a pair 43, 45 of fluorescent lamps of tubular U-configuration and located centrally within inner grid 37. Lamps 43, 45 are each of U-shaped configuration with each having its ends terminating side-by-side, and plugged into respective sockets 47, 49 on the under surface of the inner cover 25. A metal support 51 extending downwardly from cover 25 includes spring clips as shown at 53 which secure the bend portions of each of lamps 43, 45.

Referring now to FIG. 5, circuitry of the new electronic insect killer is illustrated, being generally designated 55. Said circuitry is mounted upon a circuit board 57 (FIG. 2) which is mounted upon inner cover 25 by standoffs 59.

AC line voltage at typically 120 VRMS powers the new circuitry, being provided by a plug PL1 to a full wave diode rectifier bridge comprising diodes D1-D4. Pulsating DC output of the bridge is filtered by a capacitor C1. A further capacitor C4 filters high frequency components from the power supply to prevent introducing noise to the AC line. The lower side of capacitor C1 is connected to the junction of commonly connected emitters of a pair of NPN transistors Q1, Q2, each having its collector connected to one end of a transformer primary winding section PR1, PR2. The center tap between the latter is connected to the upper side of capacitor C1.

Said primary windings form part of a transformer T1 having a toroidal core 61 of a ferrite material. Also wound upon said core are further primary windings in the form of two sections PR3, PR4 with a center tap between them connected also to the commonly connected emitters of transistors Q1, Q2. The ends of the upper sections are connected through respective resistors R1, R2, each shunted by respective capacitors C2, C3, to the bases of transistors Q1, Q2. Connected between the base of these two transistors is a small saturating inductor SR1 having a toroidal core 63. A diode D5 between the commonly connected emitters of the transistors and one side of primary winding center tap is provided for circuit starting purposes. Also a thermistor R3 is provided for providing a bias voltage to the bases of the transistors to initiate conduction of either Q1 or Q2. Said thermistor is of the type having a positive temperature coefficient of resistivity. Thus, bias current will fall off rapidly upon heating. Diodes D6, D7 are connected across the emitter-collector terminals of the transistors to prevent excessive reverse bias voltages at the collectors of the transistors.

Sections PR1, PR2 are adapted to be alternately energized current developed from the DC voltage across capacitor C1 in response to high frequencies alternate conduction of transistors Q1, Q2, which are seen to be connected by push-pull, inverter configuration.

Primary winding sections PR3, PR4 generate feedback voltages, in response to the alternating field generated by energization of winding sections PR1, PR2, which are provided through resistors R1, R2. The latter limit the current which may flow in response to said feedback voltages but provides sufficient current for base drive for alternate conduction of transistors Q1, Q2. Capacitors C2, C3 are preferably utilized for providing more rapid switching of the conductive state of the respective transistors Q1, Q2.

Saturating inductor SR1 is utilized to control the base voltages for transistors Q1, Q2. More specifically, transistor Q1 is initially rendered conductive by a base current $$Ib = \frac{(PR4) - Vbe}{R2},$$

where (PR4) is the voltage developed across primary winding section PR4, transistors Q2 being biased off by the reverse voltage developed across winding PR3 applied to resistor R1. Voltage across the saturating inductor SR1 is initially of a value $Vab = (PR3) + Vbe$, where (PR3) is the voltage developed across primary winding section PR3. As the saturable reactor reaches core saturation, Vab collapses robbing transistor Q1 of its base drive. The field of transformer T1 thereafter collapses, reversing the voltage across the feedback winds PR3, PR4 and driving transistor Q2 into conduction as soon as saturable reactor SR1 comes out of saturation, such process repeating at a frequency which preferably is at least 4 kHz and more preferably about 20 kHz.

A secondary winding X1 of transformer T1, which may be numerous turns of conductor, which is pyramid wound and impregnated, is adapted to provide high voltage, e.g., about 5,000 VRMS at a current of 20 mA. This high AC voltage is provided by leads 65, 65' to the respective outer and inner grid-form electrodes 37, 39, there being no fusing, voltage regulating devices or the like connected across such leads 65, 65' as the same are not necessary in the new circuit.

Transformer T1 is also provided with a plurality of high reactance, i.e., relatively loosely coupled, secondary windings, including a secondary winding having three sections X2, X3, and X4, as well as a further winding X5, with the latter two winding sections X2 and X5 each adapted to develop about three and one-half VRMS at approximately one-half ampere, and with section X4 developing about twice the latter voltage. Winding section X3 preferably provides a potential of about 200 VRMS at nearly one-half ampere under load conditions for energization of fluorescent lamps 43, 45 with approximately 100 VRMS across each.

Lamp 43 is seen to have a filament 67 at one end which is connected across winding section X2. A filament 69 is connected at the other end in series with a filament 71 of the other lamp 45 across a winding section X4. Lamp 45 has a filament 73 at the other end which is connected across winding section X5. A capacitor C4 is connected between the upper sides of winding section X4 and the upper end of winding section X3, being provided for causing lamp 45 to ionize before lamp 43. In operation, it will be seen that the new circuitry 55 provides not only high voltage across electrodes 37, 39 at high frequency, but also provides high frequency AC energization at lower voltage for energization of lamps 43, 45, again at the high operating frequency of the circuit.

Such high frequency energization of the grids 37, 39 and lamps 43, 45 provides numerous advantages in the new electronic insect killer.

Typically, as noted, insect electrocution devices utilizing high voltage must have the high voltage supply limited to a relatively low maximum current, such as 10 mA, for safety purposes and specifically to ensure against electrocution of persons or animals. It will be understood, for example, that the human body represents a discrete resistance (which may be assumed to be 1.5 kilo-ohm), shunted by an extrinsic capacitance which may be assumed to be 0.15 microfarad. Therefore, the effective impedance of the human body is complex, being frequency dependent.

But because of the capacitive effect of the human body, thorasic current distribution at high frequencies is far more favorable. Accordingly, a much higher current may be utilized at the high frequency typically of the new circuit 55, in contrast with the usual line voltage frequency of 60 Hertz upon which certification standards have been based. As a consequence, the new circuit allows a load current of 20 mA to flow from the high voltage winding X1 without compromising human safety. Accordingly, the new circuit makes available much more electrical power for carbonizing insects, thereby avoiding clogging, overloading, etc., than prior art electrocution devices.

Further, the intrinsic efficiency of the new circuitry may approach about 90 percent under full load conditions, in contrast with prior art electrution devices which may be able to obtain efficiencies of only about 60–70 percent.

It is also manifest that no ballast transformers or other ballasting devices are needed for fluorescent lamps 43, 45, the high reactance secondary winds interconnected with such lamps obviating such ballasting. Additionally, fluorescent lamps of the present character, each of which may have a 40 watt rating, operate much more efficiently at higher frequencies, being typically 20–30 percent more efficient at operating frequencies of 4 kHz and decidedly more efficient at the nominal preferred operating frequency of the new circuit, namely 20 kHz.

Further advantages of the circuit result from the self-regulating character of the new inverter circuit wherein feedback voltages are developed by primary winding sections PR3, PR4 for driving transistors Q1, Q2 alternately into conduction, as well as resulting from the intrinsic precision of voltages developed across the secondary winding. Therefore, high voltage regulating devices, such as expensive varistors typically used in prior art devices, are dispensed with.

Moreover, the new circuit is inherently self-protected against the possibility of a short circuit. For example, if a conductive object should bridge electrodes 37, 39, the same will merely cause the magnetic field in core 61 of transformer T1 to collapse, preventing base drive from being developed by the feedback windings PR3, PR4. Therefore, both of the transistors Q1, Q2 cease alternate conduction upon any short circuitint of the secondary winding.

CONTINUATION-IN-PART

Referring to FIG. 6, there is illustrated alternative circuitry of the invention which operates to preferably provide high DC voltage for electrodes 37, 39, although it may instead be utilized to provide high AC voltage. The circuitry of FIG. 6 is adapted to operate at somewhat higher frequencies than the circuitry of FIG. 5.

AC voltage is applied, typically at 120 VRMS, by a plug PL2 to a line filter LF1 and through a fuse F1 to a full-wave rectifier including diodes D10–D13 for providing two DC voltages. Diodes D10–D13 and filter capacitor C6 provide a DC voltage used in conjunction with a field effect transistor (FET) Q3 for providing a high frequency alternating voltage to the primary winding PR1 of a transformer T2. A second DC voltage is developed by capacitors C7 and C8, as well as a diode D14 and zener diode D15. This voltage is preferably 12 volts for being supplied to an oscillator circuit Z1. The latter is a commercially available integrated circuit timing device, such as type 555. Such low voltage also provides drive for switching element Q3. Control voltage for overload circuitry is also driven from this low voltage source.

Line filter LF1 is preferred for preventing AC noise from being coupled into the circuitry as well as for preventing high frequency noise generated by the circuitry from being transformed onto the AC power line to which plug PL2 is connected, thereby preventing the circuitry from causing excessive EMI. Of course, different input voltages can be utilized, such as 208 VRMS, 240 VRMS, or DC voltages may be provided directly to the circuitry, such as at 12, 24, and 48 volts, in which case the power supply components are omitted.

The integrated circuit timer Z1 provides a high frequency pulse train to control the gate terminal of FET Q3, which is of the N-channel type. Circuit timer Z1 may provide a pulse repetition rate of from about 2 to 100 kHz, it being preferred to utilize relatively high frequency such as 20–40 kHz or more.

Interconnected with timer circuit Z1 are resistors R5, R6, diodes D17, D18 and capacitor C10 which determine the circuit's output frequency or pulse repetition rate, and duty cycle. Capacitor C11 provides a bypass filtering function to prevent noise on the 12 VDC supply potential from causing erratic operation of circuit Z1.

Overload protection for the circuitry is provided by a NPN transistor Q4, resistors R8, R9 and R10, and a capacitor C13. As current flows through R10, a voltage is developed, which is selectively applied through a variable resistance or potentiometer R11 for setting a thershold voltage for conduction of transistor Q4. Capacitor C13 provides a low pass filter function for operation of Q4. If the predetermined threshold voltage thus established for the base of Q4 is exceeded, Q4 becomes conductive for clamping pin 4 of timer circuit Z1 to ground, thus providing a reset condition for the circuit to prevent oscillation. The output of the timer circuit, is, accordingly, held at ground potential until the reset voltage returns to +12 VDC as permitted when transistor Q4 once more becomes non-conductive. In order to protect FET Q3 from excessive drain-to-source current and voltage stresses, load line shaping is provided by diode D19, resistor R12, and capacitor C14. Hence, safe operating limits for FET Q3 are realized. This technique is also applied to the circuitry of FIG. 7.

In view of the foregoing, it will be apparent that timer circuit Z1 drives the gate of FET Q3 at the predetermined pulse repetition rate to apply DC pulses across primary winding PR1. A secondary winding X1, being fabricated with a universal winding technique, thus developes high voltage for being supplied across electrocution grid electrodes 37, 39. In order to prevent excessive AC current due to the low impedance of electrocution grids 37, 39 as a result of the high operating frequency, diode D20 and filtering capacitor C15 provide instead a high DC voltage across electrocution grids 37, 39. This voltage may be from typically 4500 VDC to 15,000 VDC and is determined by the free air break-over voltage intrinsically characteristic of the physical spacing and configuration of electrodes 37, 39.

As will be apparent, secondary windings X2, X3, X4, and X5 of transformer T2 are interconnected with fluorescent lamps 43, 45 precisely as in FIG. 5. Additionally, a capacitor C16 is connected across lamp 43, for starting. Capacitor C4 provides, as in FIG. 5, reactance for the AC voltage applied across the lamps. But, such voltage is, of course, small compared with that applied across grid electrodes 37, 39.

Figure 7:
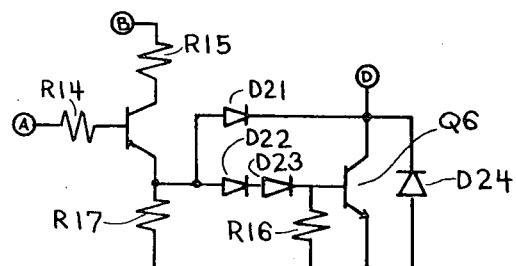
FIG. 7 is a schematic circuit diagram of electronic circuitry which may be substituted for certain components of the circuitry of FIG. 6.

In lieu of FET Q3, the circuitry of FIG. 7 may be utilized. It is connected, as indicated at A, B, C, and D in the circuitry of FIG. 6 and constitutes a bipolar replacement for the FET. Referring to FIG. 7, such circuitry includes a pair of NPN transistors Q5, Q6, resistors R14–R17, and diodes D21–D24.

Accordingly, it will be seen that several objects of the invention are attained and various other advantages also result.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An electronic insect killer comprising a plurality of spaced electrodes adapted to be electrically contacted by the bodies of insects, means for attracting insects toward said electrodes comprising at least one fluorescent lamp, and solid state circuitry interconnected with said electrodes and also with said lamp for providing both a high voltage and a lower voltage at a high AC frequency, said high voltage being supplied across said electrodes and said lower voltage being supplied to said lamp for ballast-free energization of said lamp said high voltage being DC.

2. An electronic insect killer according to claim 1 and further characterized by said solid state circuitry comprising a high frequency transformer and electronic switching means interconnected with a primary winding of said transformer, said transformer having a first secondary winding providing high AC voltage, means for rectifying said high AC voltage to provide said high DC voltage, and a further secondary winding interconnected with said lamp.

3. An electronic insect killer according to claim 2 and further characterized by said electronic switching means comprising a high frequency timer and at least one transistor interconnected with said timer for being alternately driven between conductive and non-conductive states for controlling the supply of current to said primary winding.

4. An electronic insect killer according to claim 3 and further characterized by said transistor comprising a field effect transistor, said high frequency timer comprises an integrated circuit timing device.

5. An electronic insect killer according to claim 4 and further characterized by overload protection means for causing said timing device to cease operation in the event of overload of said solid state circuitry.

6. An electronic insect killer according to claim 5 and further characterized by said overload protection means comprising a transistor interconnected with said field effect transistor for causing said solid state timing device to cease providing pulses to said field effect transistor in the event of excessive current being switched by said field effect transistor under overload conditions.

7. An electronic insect killer comprising a plurality of spaced electrodes adapted to be electrically contacted by the bodies of insects, means for attracting insects toward said electrodes, and solid state circuitry, including transistor switching means and a high frequency transformer having a primary winding, provided with current by said switching means, and a secondary winding, for providing a high AC voltage, means for rectifying said high AC voltage to provide a high DC voltage for insect electrocution, said means for attracting insects comprising at least one fluorescent lamp, said transformer having a further secondary winding for providing a lower AC voltage at high frequency to said lamp for ballast-free energization of said lamp, said electrodes surrounding said lamp, and means for supplying said high DC voltage across said electrodes.

8. An electronic insect killer according to claim 7 comprising oscillator means constituting a source of high frequency pulses for being provided to said transistor switching means for causing high frequency current to be provided to said primary winding be said transistor switching means.

9. An electronic insect killer according to claim 8 and further characterized by said oscillator means comprising a high frequency timer, and overload protection means for causing said oscillator means to cease operation in the event of overload of said solid state circuitry, as indicated by increase in the current through said primary winding above a preselected threshold.

* * * * *